US011515963B2

(12) United States Patent
Liu et al.

(10) Patent No.: US 11,515,963 B2
(45) Date of Patent: Nov. 29, 2022

(54) MULTIPLE CSI REPORTS

(71) Applicant: LENOVO (BEIJING) LIMITED, Beijing (CN)

(72) Inventors: Bingchao Liu, Beijing (CN); Chenxi Zhu, Fairfax, VA (US); Hongmei Liu, Beijing (CN); Wei Ling, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/052,366

(22) PCT Filed: May 11, 2018

(86) PCT No.: PCT/CN2018/086507
§ 371 (c)(1),
(2) Date: Nov. 2, 2020

(87) PCT Pub. No.: WO2019/213943
PCT Pub. Date: Nov. 14, 2019

(65) Prior Publication Data
US 2021/0176001 A1    Jun. 10, 2021

(51) Int. Cl.
*H04L 1/00*    (2006.01)
(52) U.S. Cl.
CPC .......... *H04L 1/0026* (2013.01); *H04L 1/0027* (2013.01)
(58) Field of Classification Search
CPC .... H04L 1/0026; H04L 1/0027; H04L 1/0033
See application file for complete search history.

(56) References Cited

U.S. PATENT DOCUMENTS

| 2016/0338041 | A1 | 11/2016 | Li et al. |
| 2018/0092149 | A1 | 3/2018 | Davydov et al. |
| 2020/0022161 | A1* | 1/2020 | Yang ..................... H04L 5/0087 |
| 2020/0177254 | A1* | 6/2020 | Lee ...................... H04B 7/0626 |

FOREIGN PATENT DOCUMENTS

| CN | 102938680 A | 2/2013 |
| EP | 2670187 A1 | 12/2013 |

OTHER PUBLICATIONS

ETSI "Physical layer procedures for data", 3GPP 5G Global Initiative, TS 38.214 V15.3.0, Release 15, Oct. 2018, pp. 1-99.
PCT/CN2018/086507, "International Search Report and the Written Opinion of the International Search Authority" ISA/CN, State Intellectual Property Office of the P.R. China, Jan. 15, 2019, pp. 1-6.
Samsung, "Priority rules for CSI feedback for eCA", 3GPP TSG RAN WG1 #82, R1-154120, Aug. 24-28, 2015, Beijing, China, pp. 1-3.
Nokia, "CR to 38.214 capturing the RAN1#92bis meeting agreements", 3GPP TSG-RAN1 Meeting #92bis, 1-1805796, Apr. 16-20, 2018, Sanya, P.R. China, pp. 1-83.

* cited by examiner

*Primary Examiner* — Mansour Oveissi
(74) *Attorney, Agent, or Firm* — Kunzler Bean & Adamson

(57) ABSTRACT

Methods and apparatuses for sending and receiving CSI reports are disclosed. A method, comprising: receiving triggering information for N aperiodic Channel Suite Information (CSI) reports and the CSI reference signal (CSI-RS) resources linked with the N CSI reports, wherein N is an integer greater than 1; determining M CSI reports and calculating M CSIs each indicated by a determined CSI report according to the CSI-RS resources linked with the determined M CSI reports, wherein M is an integer than is less than N; and sending M CSI reports each indicating a calculated CSI.

16 Claims, 4 Drawing Sheets

MULTIPLE CSI REPORTS

FIELD

The subject matter disclosed herein generally relates to wireless communications and, more particularly, to multiple channel state information (CSI) reports.

BACKGROUND

The following abbreviations are herewith defined, some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), New Radio (NR), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Channel State Information (CSI), CSI Reference Signal (CSI-RS), Layer 1 Reference Signal Receiving Power (L-RSRP) Physical Uplink Shared Channel (PUSCH), Physical Downlink Control Channel (PDCCH), Orthogonal Frequency Division Multiplexing (OFDM).

A UE may perform aperiodic CSI reporting using PUSCH scheduled by a gNB. Upon receiving triggering information from the gNB, the UE shall calculate CSI and send the CSI report to the gNB. A UE that is capable of simultaneously calculating X number of CSIs is said to have X CSI processing units. For aperiodic CSI reports using aperiodic CSI-RS (with a single CSI-RS resource in the resource set for channel measurement), the CSI processing unit remains occupied from the first OFDM symbol after the PDCCH trigger until the last OFDM symbol of the PUSCH carrying the CSI report. In the condition that N (N is an integer greater than 1) CSI reports (each with a single CSI-RS resource in the resource set for channel measurement) are triggered in a slot by the gNB while the UE only has M (M is an integer less than N) unoccupied CSI processing units (which means that the UE can only calculate M CSIs at that time), the UE may only calculate M CSI and send N CSI reports to the gNB. It is yet to be determined how to select M CSIs to be calculated (or M CSI reports to be sent).

BRIEF SUMMARY

Methods and apparatuses for sending and receiving CSI reports are disclosed.

In one embodiment, a method comprising: receiving triggering information for N aperiodic Channel State Information (CSI) reports and the CSI reference signal (CSI-RS) resources linked with the N CSI reports, wherein N is an integer greater than 1; determining M CSI reports and calculating M CSIs each indicated by a determined CSI report according to the CSI-RS resources linked with the determined M CSI reports, wherein M is an integer than is less than N; and sending M CSI reports each indicating a calculated CSI.

In one embodiment, the M CSI reports linked to the first received M CSI-RS resources are determined.

In some embodiment, each CSI report is associated with a ReportConfigID, and the M CSI reports associated with the first M smaller ReportConfigID values are determined.

In some embodiment, the M CSI reports are determined according to a value $Pri_{iCSI}(k, c, s)$, wherein $Pri_{iCSI}(k, c, s) = N_{cells} \cdot M_s \cdot k + M_s \cdot c + s$, where, k=0 for a CSI report carrying L1-RSRP and k=1 for a CSI report not carrying L1-RSRP; c is the serving cell index; $N_{cells}$ is the maximum number of serving cells configured by the higher layer parameter; s is the ReportConfigID associated with the CSI report; and M is the maximum number of CSI report configurations configured by the higher layer parameter. The M CSI reports having the first M lower values are determined In some embodiment, indication information is sent along with the M CSI reports, the indication information indicates which M CSI reports are sent. Preferably, the indication information is a bitmap with a length of N, each bit in the bitmap represents whether or not a CSI report corresponding to said bit is sent, the bit is set to '1' to indicate that corresponding CSI report is sent, and the bit is set to '0' to indicate that corresponding CSI report is NOT sent.

In another embodiment, a remote unit, comprising: a transceiver that receives, from a base unit, triggering information for N aperiodic Channel State Information (CSI) reports and the CSI reference signal (CSI-RS) resources linked with the N CSI reports, wherein N is an integer greater than 1; and a processor that determines M CSI reports and calculates M CSIs each indicated by a determined CSI report according to the CSI-RS resources linked with the determined M CSI reports; wherein the transceiver sends, to the base unit, M CSI reports each indicating a calculated CSI.

In yet another embodiment, a method, comprising: sending triggering information for N aperiodic Channel State Information (CSI) reports and the CSI reference signal (CSI-RS) resources linked with the N CSI reports, wherein N is an integer greater than 1; and receiving M CSI reports each indicating a calculated CSI, wherein M is an integer than is less than N, wherein the received M CSI reports are determined based on a predetermined rule.

In further embodiment, a base unit, comprising: a transceiver that sends triggering information for N aperiodic Channel State Information (CS) reports and the CSI reference signal (CSI-RS) resources linked with the N CSI reports, wherein N is an integer greater than 1, wherein the transceiver further receives M CSI reports each indicating a calculated CSI, wherein M is an integer than is less than N, and the received M CSI reports are determined based on a predetermined rule.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

Figure 1:
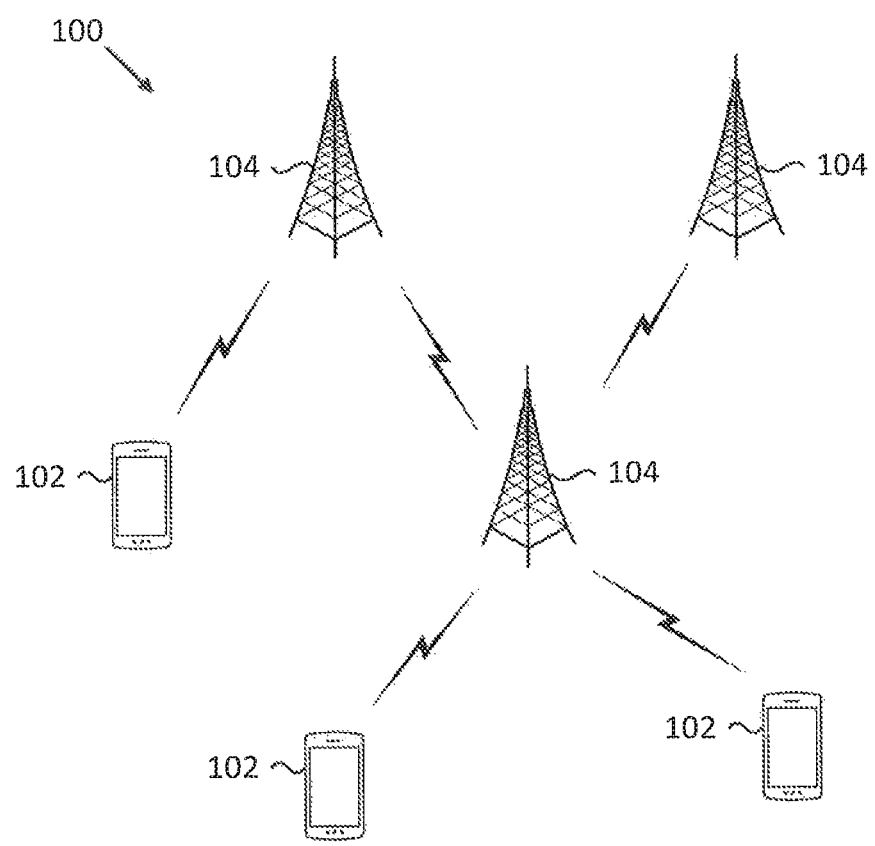
FIG. 1 is a schematic block diagram illustrating one embodiment of a wireless communication system for sending CSI reports.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions/acts specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The description of elements in each figure may refer to elements of proceeding figures. Like numbers refer to like elements in all figures, including alternate embodiments of like elements.

FIG. 1 depicts an embodiment of a wireless communication system 100 for reporting multiple CSI. In one embodiment, the wireless communication system 100 includes remote units 102 and base units 104. Even though a specific number of remote units 102 and base units 104 are depicted in FIG. 1, one skilled in the art will recognize that any number of remote units 102 and base units 104 may be included in the wireless communication system 100.

In one embodiment, the remote units 102 may include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. The remote units 102 may be referred to as subscriber units, mobiles, mobile stations, users, terminals, mobile terminals, fixed terminals, subscriber stations, user equipment (UE), user terminals, a device, or by other terminology used in the art.

The remote units 102 may communicate directly with one or more of the base units 104 via UL communication signals. A remote unit may connect to the base unit with one or more cells.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR (5G). More generally, however, the wireless communication system 100 may implement some other open or proprietary communication protocol.

The base units 104 may serve a number of remote units 102 within a serving area, for example, a cell (or a cell sector) or more cells via a wireless communication link. The base units 104 transmit DL communication signals to serve the remote units 102 in the time, frequency, and/or spatial domain.

Figure 2:
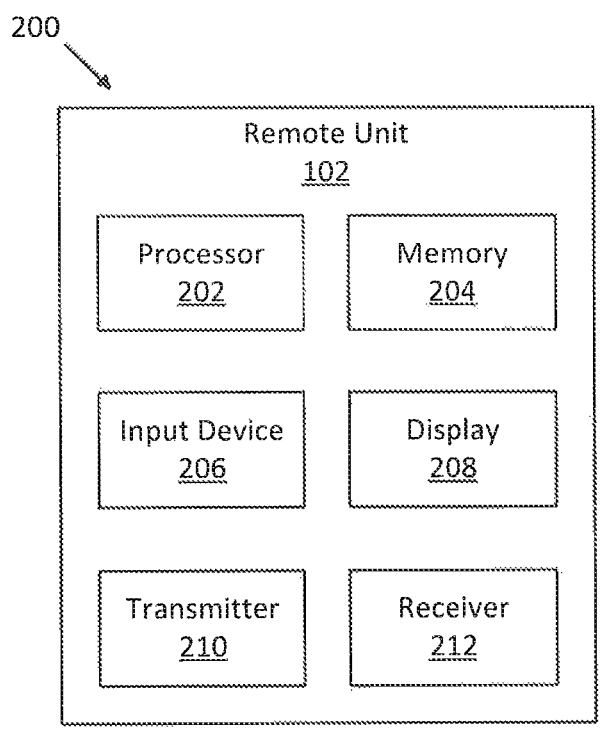
FIG. 2 is a schematic block diagram illustrating one embodiment of an apparatus that may be used for sending CSI reports.

FIG. 2 depicts one embodiment of an apparatus 200 that may be used for reporting multiple CSI. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touch screen. In certain embodiments, the remote unit 102 may not include any input device 206 and/or display 208. In various embodiments, the remote unit 102 may include at least one of the processor 202, the memory 204, the transmitter 210 and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to system parameters. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touch screen or similar touch-sensitive display. In some embodiments, the input device 206 includes a touch screen such that text may be input using a virtual keyboard displayed on the touch screen and/or by handwriting on the touch screen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touch screen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the transmitter 210 and the receiver 212 may transmit and receive resources via different cells. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
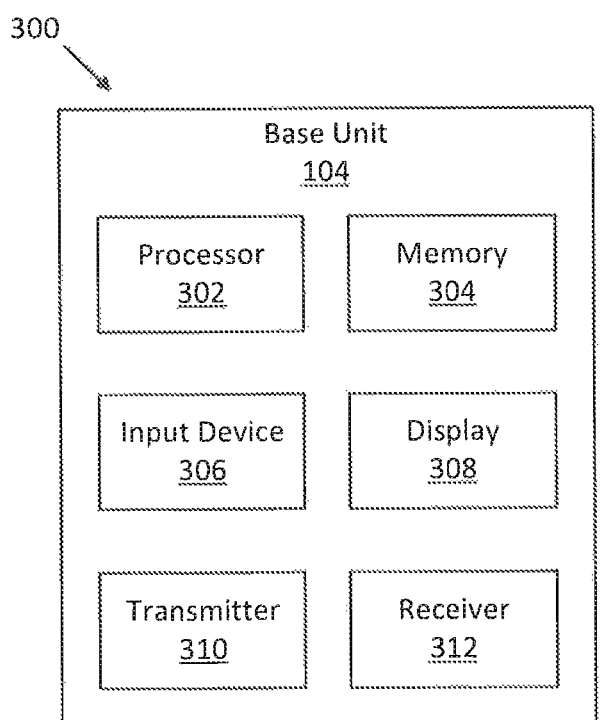
FIG. 3 is a schematic block diagram illustrating one embodiment of an apparatus that may be used for sending CSI reports.

FIG. 3 depicts one embodiment of an apparatus 300 that may be used for reporting multiple CSI. The apparatus 300 includes one embodiment of the base unit 104. Furthermore, the base unit 104 may include at least one of a processor 302, a memory 304, an input device 306, a display 308, a transmitter 310 and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Traditionally, when a base unit requires a remote unit to send N aperiodic CSI reports, the remote unit will calculate N CSIs, each indicated by an aperiodic CSI report, and send N aperiodic CSI reports, each including a calculated CSI, to the base unit.

However, in the condition that a remote unit is triggered by a base unit to send N (N is an integer greater than 1) aperiodic CSI reports while the remote unit only has M (M is an integer that is less than N) unoccupied CSI processing units that are only able to calculate M CSIs, the remote unit may choose to only send M aperiodic CSI reports to the base unit. There are various ways to determine which M aperiodic CSI reports are sent to the base unit.

Figure 4:
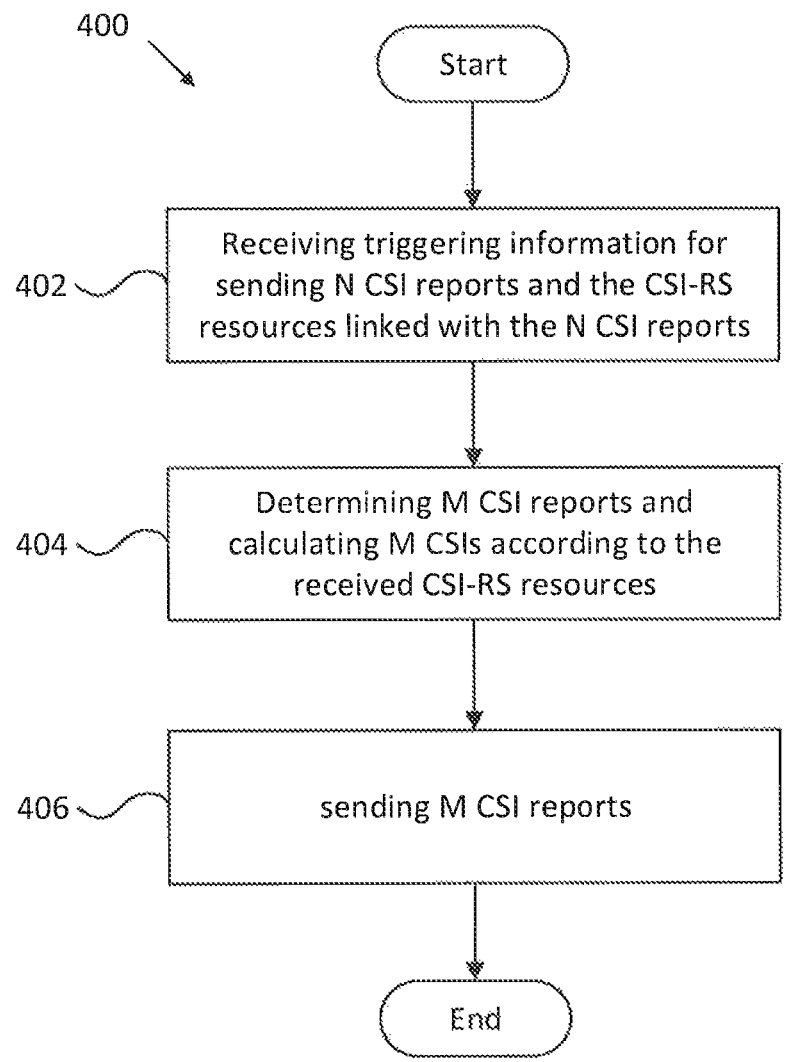
FIG. 4 is a schematic flow chart diagram illustrating an embodiment of a method for sending CSI reports.

FIG. 4 is a schematic flow chart diagram illustrating the embodiment of a method for sending CSI reports.

In step 402, triggering information for sending N CSI reports is received by a remote unit. In one embodiment, the CSI reports are aperiodic CSI reports. The triggering information requires sending N aperiodic CSI reports. Each aperiodic CSI report indicates a CSI to be calculated by the remote unit. Each CSI report is linked with a CSI-RS resource in a CSI-RS resource set. The CSI-RS resource is for the remote unit to calculate CSI.

In an embodiment, each CSI report is associated with a ReportConfigID.

Different CSI reports are associated with different ReportConfigIDs. In another embodiment, each CSI report is associated with a $Pri_{iCSI}(k, c, s)$ value. $Pri_{iCSI}(k, c, s) = N_{cells} \cdot M_s \cdot k + M_s \cdot c + s$, where k=0 for a CSI report carrying L1-RSRP and k=1 for a CSI report not carrying L1-RSRP; c is the serving cell index; $N_{cells}$ is the maximum number of serving cells configured by the higher layer parameter; s is the ReportConfigID associated with the CSI report; and $M_s$ is the maximum number of CSI report configurations configured by the higher layer parameter.

In step 404, upon receiving the triggering information, M CSI reports have to be determined since the base unit has only M (M<N) unoccupied CSI processing units. M CSIs, each of which is indicated by a determined CSI report, are calculated according to the received CSI-RS resources.

In step 406, the M CSI reports, each of which includes a calculated CSI, are sent to the base unit.

There are various ways to determine which M CSI reports are to be sent to the base unit.

According to a first embodiment, the remote unit determines the M CSI reports linked to the first M received CSI-RS resources.

The CSI-RS resources linked with N CSI reports may be received at N different time instants by the remote unit. Preferably, upon receiving one CSI-RS resource, the remote unit calculates one CSI indicated by the CSI report linked with the received CSI-RS resource. Because the remote unit only has M unoccupied CSI processing units, the remote unit determines M CSI reports linked to the first M received CSI-RS resources and calculates M CSIs indicated by the M CSI reports linked with the first M received CSI-RS resources. Alternatively, the remote unit may, upon receiving all of M CSI-RS resources, calculate M CSIs indicated by the M CSI reports linked with the M CSI-RS resources.

According to a second embodiment, the remote unit determines the M CSI reports associated with the first M smaller ReportConfigID values and calculates M CSIs indicated by the determined M CSI reports.

The base unit associates a single ReportConfigID with each CSI report. A first CSI report is said to have a higher priority than a second CSI report in the condition that the ReportConfigID value associated with the first CSI report is lower than the ReportConfigID value associated with the second CSI report.

An example of the second embodiment is described as follows.

CSI report 1 is associated with ReportConfigID0, CSI report 2 is associated with ReportConfigID1, . . . , and CSI report N is associated with ReportConfigIDN−1, wherein ReportConfigID0<ReportConfigID1<ReportConfigIDN−1 is satisfied. The remote unit only calculates M CSIs indicated by the M CSI reports (i.e., from CSI report 1 to CSI report M) associated with the first M smaller ReportConfigIDs (i.e., from ReportConfigID0 to ReportConfigIDM−1).

According to a third embodiment, the remote unit determines the M CSI reports based on a predefined rule. Preferably, the predefined rule prioritizes the CSI reports by a priority value.

An example of the third embodiment is described as follows.

The priority value of a CSI report is $Pri_{iCSI}(k, c, s)$.

$Pri_{iCSI}(k, c, s) = N_{cells} \cdot M_s \cdot k + M_s \cdot c + s$, in which "·" means "multiply," and where k=0 for a CSI report carrying L1-RSRP and k=1 for a CSI report not carrying L1-RSRP;

c is the serving cell index, i.e., the index of the serving base unit;

$N_{cells}$ is the maximum number of serving cells (i.e., serving base units) configured by the higher layer parameter;

s is the ReportConfigID associated with the CSI report; and $M_s$ is the maximum number of CSI report configurations configured by the higher layer parameter.

A first CSI report is said to have a higher priority than a second CSI report in the condition that the $Pri_{iCSI}(k, c, s)$ value of the first CSI report is lower than the $Pri_{iCSI}(k, c, s)$ value of the second CSI report.

The remote unit only calculates the CSIs indicated by the CSI reports with first M higher priorities (i.e., with the first M smaller $Pri_{iCSI}(k, c, s)$ values).

According to the first through third embodiments, the rule for determining the M CSI reports is predetermined between the base unit and the remote unit. In other words, after M CSIs have been calculated, M CSI reports, including the calculated M CSIs, may be sent to the base unit using the PUSCH scheduled by the base unit, because the base unit knows, by the predetermined rule, which M out of N CSI reports are sent.

According to a fourth embodiment, the rule for determining the M CSI reports is only determined by the remote unit. The base unit does not know the rule based on which the remote unit determines the M CSI reports to be sent to the base unit. The remote unit may adopt any rule to determine the M CSI reports. The remote unit UE is required to report to the base unit which M CSI reports are sent along with the transmission of the M CSI reports.

An example of the fourth embodiment is described as follows.

The remote unit may determine any M CSI reports according to any rules. The remote unit may send to the base unit the M CSI reports along with indication information that indicates which M CSI reports are sent. Preferably, the indication information may be a bitmap with a length of N in which each bit represents whether or not a CSI report corresponding to said bit is sent. For example, if one CSI report is sent, the corresponding bit value in the bitmap will be set as '1,' and if one CSI report is NOT sent, the corresponding bit value in the bitmap will be set as '0.' In total, in the bitmap, M bits will be set as '1' and N-M bits will be set as '0.'

The arrangement of the bits in the bitmap is predetermined between the base unit and the remote unit. For example, the order of the bits may be arranged according to the ReportConfigID values associated with the CSI reports. The bit corresponding to the CSI report associated with a smaller value will be arranged in front of another bit corresponding to the CSI report associated with a larger value. Based on the bitmap sent from the remote unit, the base unit knows which M CSI reports are received.

According to an embodiment, the indication information may be sent before the M CSI reports.

Figure 5:
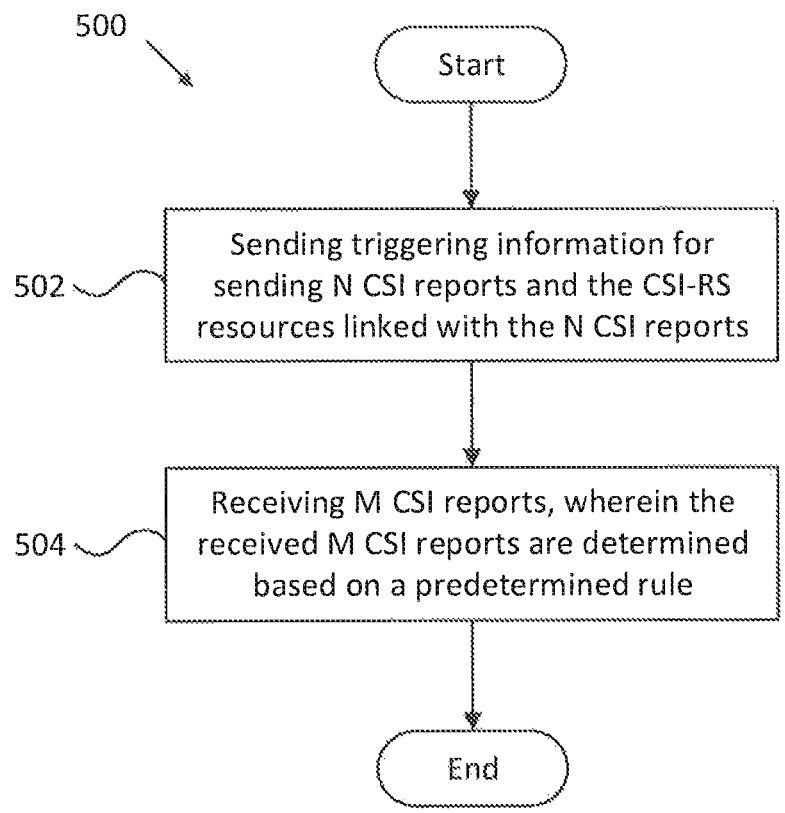
FIG. 5 is a schematic flow chart diagram illustrating an embodiment of a method for receiving CSI reports.

FIG. 5 is a schematic flow chart diagram illustrating an embodiment of a method for receiving CSI reports.

In step 502, triggering information for sending N CSI reports is sent from a base unit to a remote unit. In one embodiment, the CSI reports are aperiodic CSI reports. The triggering information requires sending N aperiodic CSI reports. Each aperiodic CSI report indicates a CSI to be calculated by the remote unit. Each CSI report is linked with a CSI-RS resource in a CSI-RS resource set. The CSI-RS resource is for the remote unit to calculate CSI. In an embodiment, each CSI report is associated with a ReportConfigID. Different CSI reports are associated with different ReportConfigIDs. In another embodiment, each CSI report is associated with a $Pri_{iCSI}(k, c, s)$ value.

In step 504, M (M<N) CSI reports each indicating a calculated CSI are received from the remote unit. Because the remote unit may only have the ability to calculate M CSIs, M out of N CSI reports are determined at the remote unit according to a rule that is predetermined between the remote unit and the base unit. The predetermined rule may be the rule described in any of the first through fourth embodiments. In the first embodiment, the M CSI reports linked to the first sent M CSI-RS resources are determined. In the second embodiment, the M CSI reports associated with the first M smaller ReportConfigID values are determined. In the third embodiment, the M CSI reports are determined according to a value $\text{Pri}_{iCSI}(k, c, s)$, wherein the M CSI reports having the first M lower values are determined. In the fourth embodiment, the rule is determined at the remote unit, and indication information indicating which M CSI reports are sent is received at the base unit. The rule for determining the M CSI reports in the fourth embodiment, that is determined only at the remote unit, is not known to the base unit. Therefore, from the point of view of the base unit, the predetermined rule is: the M CSI reports are determined at the remote unit and the remote unit would send the rule (i.e., which M CSI reports have been sent) to the base unit.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method, comprising:
   receiving triggering information for N aperiodic channel state information reports;
   determining M channel state information reports according to a priority value ($\text{Pri}_{iCSI}(k, c, s)$), wherein:
   $\text{Pri}_{iCSI}(k, c, s) = N_{cells} \cdot M_s \cdot k + M_s \cdot c + s$, k=0 for a channel state information report carrying layer 1 (L1) reference signal received power (RSRP) (L1-RSRP) and k=1 for a channel state information report not carrying L1-RSRP;
   c is a serving cell index;
   $N_{cells}$ is a maximum number of serving cells configured by a higher layer parameter;
   s is a ReportConfigID associated with a corresponding channel state information report;
   $M_s$ is a maximum number of channel state information report configurations configured by the higher layer parameter; and
   M is an integer less than or equal to N; and
   sending M channel state information reports each indicating a calculated channel state information.

2. The method of claim 1, wherein the M channel state information reports linked to first received M channel state information reference signal resources are determined.

3. The method of claim 1, wherein each channel state information report is associated with a ReportConfigID, and the M channel state information reports associated with first M smaller ReportConfigID values are determined.

4. The method of claim 1, wherein the M channel state information reports having first M lower values are determined.

5. A remote unit, comprising:
   a transceiver that receives, from a base unit, triggering information for N aperiodic channel state information reports; and
   a processor that determines M channel state information reports according to a priority value $\text{Pri}_{iCSI}(k, c, s)$, wherein:
   $\text{Pri}_{iCSI}(k, c, s) = N_{cells} \cdot M_s \cdot k + M_s \cdot c + s$, k=0 for a channel state information report carrying layer 1 (L1) reference signal received power (RSRP) (L1-RSRP) and k=1 for a channel state information report not carrying L1-RSRP;
   c is a serving cell index;
   $N_{cells}$ is a maximum number of serving cells configured by a higher layer parameter;
   s is a ReportConfigID associated with a corresponding channel state information report;
   $M_s$ is a maximum number of channel state information report configurations configured by the higher layer parameter; and
   M is an integer less than or equal to N;
   wherein the transceiver sends, to the base unit, M channel state information reports each indicating a calculated channel state information.

6. The remote unit of claim 5, wherein the M channel state information reports linked to first received M channel state information reference signal resources are determined.

7. The remote unit of claim 5, wherein each channel state information report is associated with a ReportConfigID, and the M channel state information reports associated with first M smaller ReportConfigID values are determined.

8. The remote unit of claim 5, wherein the M channel state information reports having first M lower values are determined.

9. A method, comprising:
   sending triggering information for N aperiodic channel state information reports; and
   receiving M channel state information reports each indicating a calculated CM channel state information;
   wherein the received M channel state information reports are determined according to a priority value ($\text{Pri}_{iCSI}((k, c, s))$), wherein:
   $\text{Pri}_{iCSI}(k, c, s) = N_{cells} \cdot M_s \cdot k + M_s \cdot c + s$, k=0 for a channel state information report carrying layer 1 (L1) reference signal received power (RSRP) (L1-RSRP) and k=1 for a channel state information report not carrying L1-RSRP;
   c is a serving cell index;
   $N_{cells}$ is a maximum number of serving cells configured by a higher layer parameter;
   s is a ReportConfigID associated with a corresponding channel state information report;
   $M_s$ is a maximum number of channel state information report configurations configured by the higher layer parameter; and
   M is an integer less than or equal to N.

10. The method of claim 9, wherein the M channel state information reports linked to first sent M channel state information reference signal resources are determined.

11. The method of claim 9, wherein each channel state information report is associated with a ReportConfigID, and the M channel state information reports associated with first M smaller ReportConfigID values are determined.

12. The method of claim 9, wherein the M channel state information reports having first M lower values are determined.

13. A base unit, comprising:
   a transceiver that:
   sends triggering information for N aperiodic channel state information reports; and
   receives M channel state information reports each indicating a calculated channel state information;
   wherein the received M channel state information reports are determined according to a priority value ($\text{Pri}_{iCSI}((k, c, s))$), wherein:

$Pri_{iCSI}(k, c, s) = N_{cells} \cdot M_s \cdot k + M_s \cdot c + s$, k=0 for a channel state information report carrying layer 1 (L1) reference signal received power (RSRP) (L1-RSRP) and k=1 for a channel state information report not carrying L1-RSRP;

c is a serving cell index;

$N_{cells}$ is a maximum number of serving cells configured by a higher layer parameter;

s is a ReportConfigID associated with a corresponding channel state information report;

$M_s$ is a maximum number of channel state information report configurations configured by the higher layer parameter; and M is an integer less than or equal to N.

14. The base unit of claim 13, wherein the M channel state information reports linked to first sent M channel state information reference signal resources are determined.

15. The base unit of claim 13, wherein each channel state information report is associated with a ReportConfigID, and the M channel state information reports associated with first M smaller ReportConfigID values are determined.

16. The base unit of claim 13, wherein the M channel state information reports having first M lower values are determined.

* * * * *